United States Patent
Zhao et al.

(10) Patent No.: US 8,159,539 B2
(45) Date of Patent: Apr. 17, 2012

(54) SMOKE DETECTING METHOD AND SYSTEM

(75) Inventors: Hao-Ting Zhao, Dadu Township, Taichung County (TW); Chung-Hsien Lu, Jhubei (TW); Shen-Kuen Chang, Chiayi (TW); Cheng-Wei Wang, Tainan (TW); Kun-Lin Huang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 544 days.

(21) Appl. No.: 12/402,283

(22) Filed: Mar. 11, 2009

(65) Prior Publication Data

US 2010/0097474 A1 Apr. 22, 2010

(30) Foreign Application Priority Data

Oct. 17, 2008 (TW) .............................. 97140086 A

(51) Int. Cl.
*H04N 5/225* (2006.01)
(52) U.S. Cl. ...................... 348/169; 382/103
(58) Field of Classification Search ................. 348/169, 348/143, 203, 107; 382/103
See application file for complete search history.

(56) References Cited

U.S. PATENT DOCUMENTS

| | | | |
|---|---|---|---|
| 7,859,419 B2* | 12/2010 | Shen-Kuen et al. | 340/628 |
| 2006/0115154 A1* | 6/2006 | Chen | 382/181 |
| 2007/0188336 A1* | 8/2007 | Privalov | 340/628 |
| 2008/0297360 A1* | 12/2008 | Knox et al. | 340/628 |
| 2009/0040367 A1* | 2/2009 | Zakrzewski et al. | 348/370 |

FOREIGN PATENT DOCUMENTS

| | | |
|---|---|---|
| TW | I264684 | 11/1993 |
| TW | 535956 Y | 6/2003 |

\* cited by examiner

*Primary Examiner* — Abdullahi Salad
(74) *Attorney, Agent, or Firm* — Birch, Stewart, Kolasch & Birch, LLP

(57) ABSTRACT

A smoke detecting method and system are provided. The smoke detecting method and system capture a plurality of images; determine whether a moving object exists in the plurality of images; select the images having the moving object to be analyzed; analyze whether the moving object is moving toward a specific direction and a displacement of a base point of the moving object; and determine the moving object as a smoke when the moving object is moving toward the specific direction and the displacement is less than a threshold value.

19 Claims, 4 Drawing Sheets

SMOKE DETECTING METHOD AND SYSTEM

FIELD OF THE INVENTION

The present invention relates to a smoke detecting method and system, and more particularly to a smoke detecting method and system using image analysis methods.

BACKGROUND OF THE INVENTION

In most fires, flames and smoke are generated almost at the same time, and sometimes the smoke may be generated firstly and followed by the occurrence of flames. In some fires, burning of some substances only generates the smoke without flames. Therefore, the smoke detection is a very important issue for fire prevention and rescue. When using a smoke detecting system, a fire can be reported at its early stage so that the early fire fighting may be proceeded to reduce the casualties.

The conventional smoke detecting devices, e.g. a photoelectric smoke detector and an air sampling smoke detector, use the physical properties resulting from increase of the smoke particles as the basis of fire detection. The photoelectric smoke detector emits the light, and the light is scattered and the brightness is changed when smoke particles exist in the air. Because the photoelectric smoke detector detects the variation of the brightness by light emitting to determine if there is a fire, the detecting range thereof is restricted. Therefore, the smoke detecting in large areas by the photoelectric smoke detector may not be effective. The air sampling smoke detector collects the air sample in the detecting area and analyzes the elements of the collected air to determine if there is a fire. To collect the air sample, the air sampling smoke detector must be equipped with a duct system for facilitating the detection. Besides, the sensors of the air sampling smoke detector are very expensive.

Accordingly, the conventional smoke detecting devices have the shortcomings as follows: 1) it is hard to detect a smoke in high and large-area buildings, such as the factories, the stadiums and the shopping malls, thereby wasting the early rescuing time; 2) the accuracy thereof is too low, thereby causing too many false alarms; and 3) a large number of sensors, ducts and controlling systems needs to be installed, thereby raising the cost.

Therefore, for improving the accuracy of the smoke detecting device and reducing the cost, the visual smoke detecting device has been recently developed, which identifies if there is any object whose features meet the fire smoke by using the original monitoring system in a building. Once the smoke detecting device determines the object as the fire smoke, an alarm will be generated. Such visual smoke detecting devices are designed to use many parameters relating to the features of a smoke to be analyzed, so as to make the smoke detection quick and accurate. For example, Taiwan Patent No. 535956 discloses a visual smoke detecting device for processing images and generating digital determination signals via a digital signal processing device, and Taiwan Patent Pub. No. 200617814 discloses a method and system for detecting fire by capturing images in a monitored area with an image capturing device, detecting whether an image difference is generated in the captured images by determining shades of color thereof, comparing the image difference with features of a flame or a smoke, and determining if a fire exists or is enlarged based on the comparison result. However, other parameters for precisely detecting a smoke are not applied in these patents, so the mentioned smoke detecting methods and devices will easily generate false alarms.

SUMMARY OF THE INVENTION

In order to overcome the drawbacks in the prior art, a novel smoke detecting method and system which achieve high accuracy of the smoke detection are provided.

In accordance with one aspect of the present invention, a smoke detecting method is provided. The smoke detecting method comprises the steps of capturing a plurality of images; determining whether a moving object exists in the plurality of images; selecting the images having the moving object to be analyzed; analyzing whether the moving object is moving toward a specific direction and a displacement of a base point of the moving object; and determining the moving object as a smoke when the moving object is moving toward the specific direction and the displacement is less than a threshold value.

Preferably, the smoke detecting method further comprises a step of actuating an alarm when the moving object is determined as the smoke.

Preferably, the smoke detecting method comprises the following steps: if the $n^{th}$ to $(n+k)^{th}$ images have the moving object, superimposing each of the $(n+1)^{th}$ to $(n+k)^{th}$ images on the respective preceding image thereof to generate k pieces of superimposed images, wherein n and k are natural numbers; in each of the superimposed images, determining a $P_0$ number of pixels showing an upper edge of the moving object in the preceding image and determining a P number of pixels showing an overlapped portion of the upper edge of the moving object in the superimposed image; calculating a first ratio of P to $P_0$ in the each superimposed image; calculating a second ratio of a quantity of the superimposed images having the first ratio larger than a first predetermined value to k; and determining that the moving object is moving toward the specific direction when the second ratio is larger than a second predetermined value. It is to be noted that the first ratio, the first predetermined value and the second predetermined value could be set by the user according to practical requirements, e.g. decreasing or increasing the mentioned threshold values based on environments having high or low probability of fire arising.

Furthermore, the specific direction is usually but not limited to a direction being one selected from a group consisting of an upward, a left upward and a right upward directions, and a combination thereof, and the base point is located at a bottom of the moving object.

Preferably, the steps from capturing a plurality of images to analyzing the captured images are repeated in a predetermined period, and then the step of determining the moving object as a smoke is performed based on the analytic statistics resulting from the repeated steps, so as to increase the accuracy of the smoke detecting method.

In accordance with another aspect of the present invention, a smoke detecting system is provided. The smoke detecting system comprises an image capturing device capturing a plurality of images; an analyzing device coupled to the image capturing device, determining whether a moving object exists in the plurality of images, selecting the images having the moving object to be analyzed, and analyzing whether the moving object is moving toward a specific direction; and a determining device coupled to the analyzing device, and determining the moving object as a smoke when the moving object is moving toward the specific direction.

Preferably, the smoke detecting system further comprises an alarming device coupled to the determining device, and actuating an alarm when the moving object is determined as the smoke.

Preferably, the image capturing device is one of a fixed video camera and a movable video camera. Furthermore, the image capturing device could be a monitor installed in a building for monitoring whether a fire smoke occurs in the building.

Preferably, the analyzing device further analyzes a displacement of a base point of the moving object, and the determining device determines the moving object as the smoke when the moving object is moving toward the specific direction and the displacement is less than a threshold value. The analyzing device is one of a computer and a digital signal processing chip.

In accordance with a further aspect of the present invention, a smoke detecting method is provided. The smoke detecting method comprises capturing a plurality of images; determining whether a moving object exists in the plurality of images; analyzing whether the moving object is moving toward a specific direction; and determining the moving object as a smoke when the moving object is moving toward the specific direction.

Preferably, the analyzing step comprises the steps of selecting one of the plurality of images having the moving object as a reference image; determining a plurality of pixels showing an upper edge of the moving object in the reference image; superimposing a next image of the reference image thereon to calculate a first ratio of the plurality of pixels moving toward the specific direction; selecting another one of the plurality of images having the moving object as the reference image and repeating the foregoing steps to obtain a predetermined number of superimposed images; calculating a second ratio of a quantity of the superimposed images having the first ratio larger than a first predetermined value to the predetermined number; and determining that the moving object is moving toward the specific direction when the second ratio is larger than a second predetermined value. Furthermore, the smoke detecting method further comprises a step of actuating an alarm when the moving object is determined as the smoke.

Preferably, the smoke detecting method further comprises the steps of analyzing a displacement of a base point of the moving object, and determining the moving object as a smoke when the displacement is less than a threshold value, wherein the base point is located at the bottom of the moving object.

Preferably, the steps from capturing a plurality of images to analyzing the captured images are repeated in a predetermined period, and then the step of determining the moving object as a smoke is performed based on the analytic statistics resulting from the repeated steps, so as to increase the accuracy of the smoke detecting method.

Based on the above, a smoke detecting method and system are provided in the present invention, which use specific characteristics of a smoke, i.e. the characteristics of moving toward a specific direction in a fixed period and space, and a displacement of a base point being tiny compared with other objects. Therefore, not only does the present invention solve the drawbacks in the prior art, but also it achieves high accuracy of the smoke detection. Therefore, the present invention has its utility for the industry.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present preferred embodiment will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
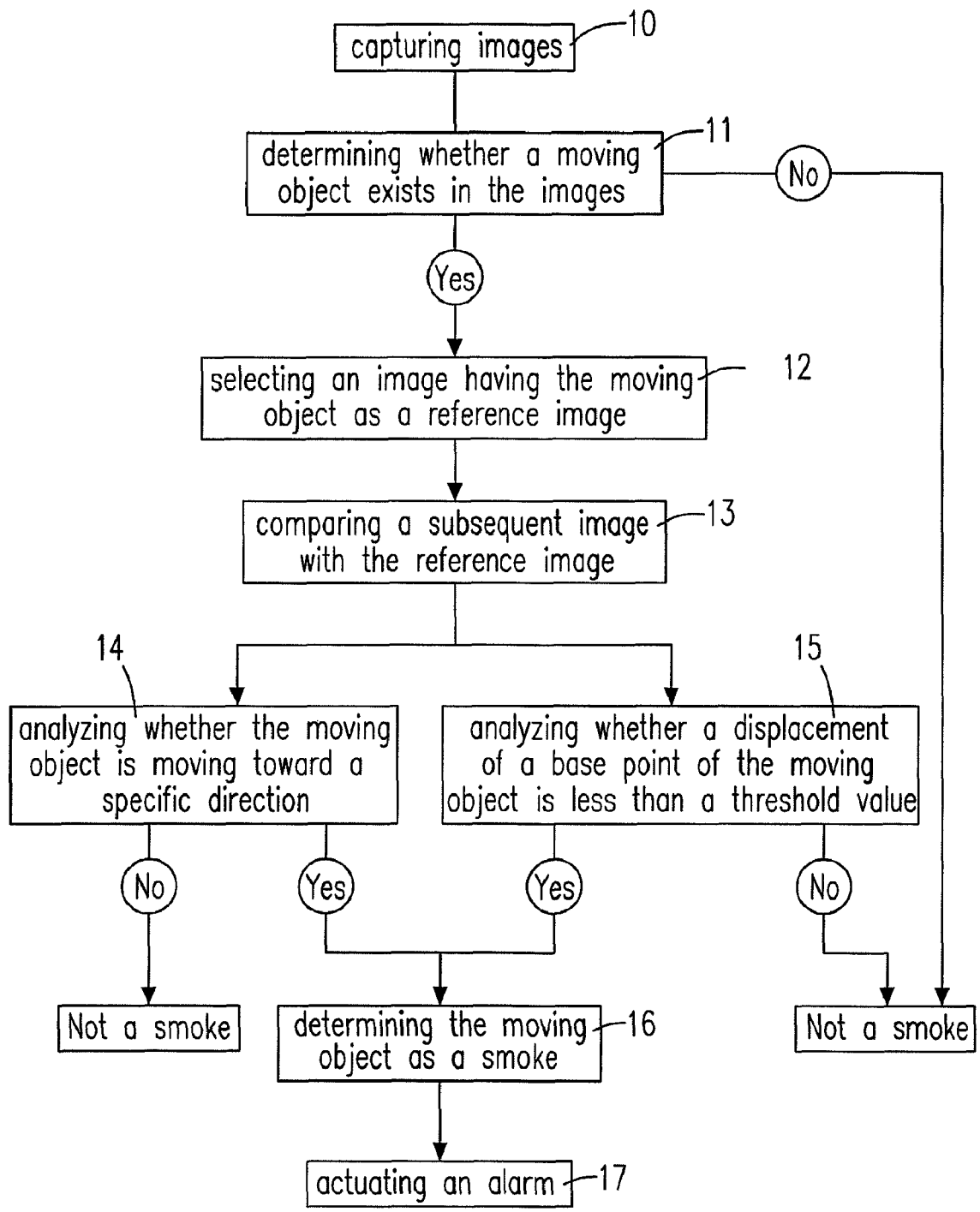
FIG. 1 is a diagram showing a flow chart of a smoke detecting method according to a preferred embodiment of the present invention.

Please refer to FIG. 1, showing a flow chart of a smoke detecting method according to a preferred embodiment of the present invention. Firstly, a plurality of images are captured by a camera in a monitored area (step 10), and the camera captures n number of images every t time, wherein t and n can be randomly set. In this embodiment, t is set as 5 seconds and n is set as 30 pieces. Then, whether the plurality of images have a moving object is determined (step 11), e.g. taking the first image as a background image of the monitored area, and comparing each of the subsequent images with the background image. If a new object is found in several of the subsequent images, compared with the background image, it means there might be an object moving in the monitored area, and the images having the new object therein are considered the images having a moving object.

After finding a moving object, the areas occupied by the moving object in the images are analyzed. One of the images having the moving object is selected as a reference image (step 12). For example, if it is found that the $10^{th}$ to $30^{th}$ images have a moving object, the $10^{th}$ image is taken as a reference image, and a subsequent image, e.g. the $11^{th}$ image, is compared with the reference image (step 13). Then the $11^{th}$ image is taken as a reference image and the $12^{th}$ image is compared with the $11^{th}$ image, which is running until the $30^{th}$ image is compared with the $29^{th}$ image. Based on the comparing results, whether the moving object is moving toward a specific direction (step 14) and whether a displacement of a base point of the moving object is less than a threshold value (step 15) are analyzed. Based on the analyzing results, the moving object is determined as a smoke when the moving object is moving toward the specific direction and the displacement is less than the threshold value (step 16).

After the steps 10 to 16, if the moving object is determined as the smoke existing in the monitored area, an alarm is actuated to announce the occurrence of a fire (step 17).

Figure 2A:
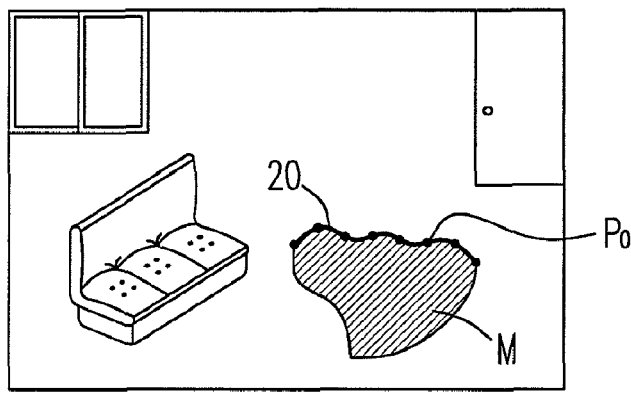
FIGS. 2(A) to 2(C) are diagrams illustrating the implementation of the steps 13 to 14 in FIG. 1.
Figure 2B:
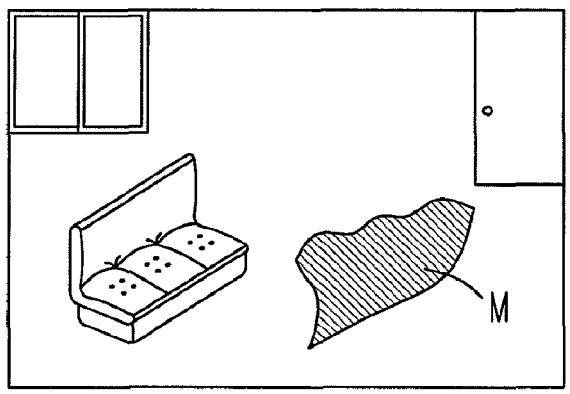
Figure 2C:
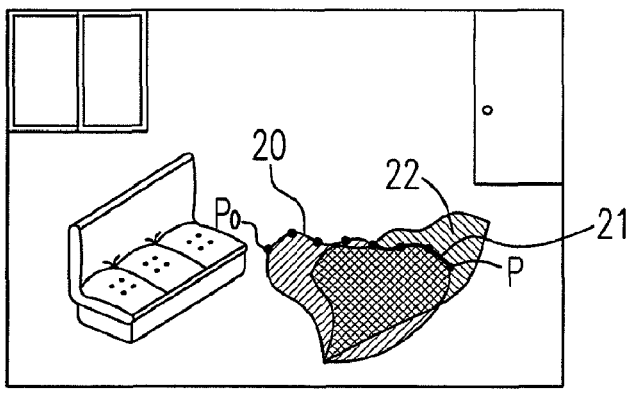

Please refer to FIGS. 2(A) to 2(C), illustrating the implementation of a preferred embodiment of the steps 13 to 14 in FIG. 1. FIG. 2(A) is hypothetically the $10^{th}$ image in the embodiment of FIG. 1, and FIG. 2(B) is hypothetically the $11^{th}$ image therein. FIG. 2(A) shows that the $10^{th}$ image, which is taken as a reference image, has a moving object M. FIG. 2(B) shows that the $11^{th}$ image also has the moving object M but an area occupied thereby is different from that in the $10^{th}$ image. FIG. 2(C) is a superimposed image of FIGS. 2(A) and 2(B).

In the following description, embodiments of the step 14 will be introduced. A next image of the reference image is superimposed on the reference image. For example, FIG. 2(C) shows the superimposed image of the $10^{th}$ and $11^{th}$ images. A $P_0$ number of pixels showing an upper edge 20 of the moving object M in the reference image are determined, as shown in FIG. 2(A). Then please refer to FIG. 2(C), wherein a newly added upper area 22 is found in the superimposed image. In the overlapped area of the superimposed image, a P number of pixels showing an overlapped portion 21 of the upper edge are determined, which are located below the newly added upper area 22. Next, a first ratio of P to $P_0$ is calculated.

Subsequently, the $11^{th}$ image is taken as a reference image and the $12^{th}$ image is compared with the $11^{th}$ image, which is running until the $30^{th}$ image is compared with the $29^{th}$ image, and the first ratio of P to $P_0$ in each superimposed image is respectively calculated. Then, a quantity of the superimposed images having the first ratio larger than a first predetermined value is calculated. Finally, it is determined that the moving object is moving toward an upward direction when a second ratio of the quantity to the amount of the superimposed images is larger than a second predetermined value. In the embodiments illustrated in FIG. 1 and FIGS. 2(A) to 2(C), if the first predetermined value is designed to be 0.8, and the second predetermined value is designed to be 0.9, the moving object M is determined as moving toward the upward direction in the t time when the quantity of the images having the ratio of $P/P_0$ larger than 0.8 is more than 18 pieces (the amount of the superimposed images is 20 when the $11^{th}$ to $30^{th}$ images are superimposed on and compared with the respective preceding image, and 20*0.9=18).

In the embodiment of the step 14, the first reference image is the first image of the images having the moving object, and each superimposed image of every two successive images is analyzed until the last image having the moving object is superimposed. However, it is practical to take any image having the moving object as the reference image and superimpose any subsequent image of the reference image thereon, such as the second or the third image after the reference image. For example, the $11^{th}$ image may be taken as the first reference image and the $13^{th}$ image is superimposed thereon as well as compared therewith. Then the $13^{th}$ image is taken as the reference image and the $15^{th}$ image is superimposed thereon as well as compared therewith. Furthermore, times of the mentioned superimposing step also can be predetermined; for example, the superimposing step can be repeated 7 times until the $25^{th}$ image is superimposed on the $23^{rd}$.

In the above-mentioned embodiment, the specific direction is an upward direction of the moving object in the image. In practice, a smoke may be moving toward a direction being one selected from a group consisting of an upward, a left upward and a right upward directions, and a combination thereof. Therefore, the specific direction can be designed according to the environment of the monitored area.

An embodiment of the step 15 is introduced as follows. The base point is set as being located at a bottom of the moving object. That is to say, the coordinates of the lowest point of the moving object in each image having the moving object are determined, and the each image is compared with a background image to obtain a displacement of the base point in the t time. Generally, a moving object such as an animal or a car may move away or close the camera so that the base point thereof will be substantially raised or lowered in a period. Comparatively, if the moving object is a smoke in the early stage of a fire, the displacement thereof will be minor because the source of the fire smoke does not disappear in a period. Therefore, based on this characteristic of the smoke, the moving object is determined as the smoke when the displacement of the moving object is less than a threshold value, which is a predetermined value.

Furthermore, for increasing the accuracy of the smoke detecting method and reducing or preventing a false alarm, t may be set longer so that the amount of images to be captured and analyzed can be increased. Besides, the steps from capturing images to analyzing the captured images can be repeated before performing the step of determining the moving object as a smoke. For example, repeating the step 10 to step 15 illustrated in FIG. 1 every 5 seconds, five analyzing results in 25 seconds will be obtained. Then only in a condition that all of the five analyzing results show that the moving object is moving toward the specific direction and the displacement is less than the threshold value, the steps 16 and 17 can be performed, which determine the moving object as a smoke and actuate an alarm.

Figure 3:
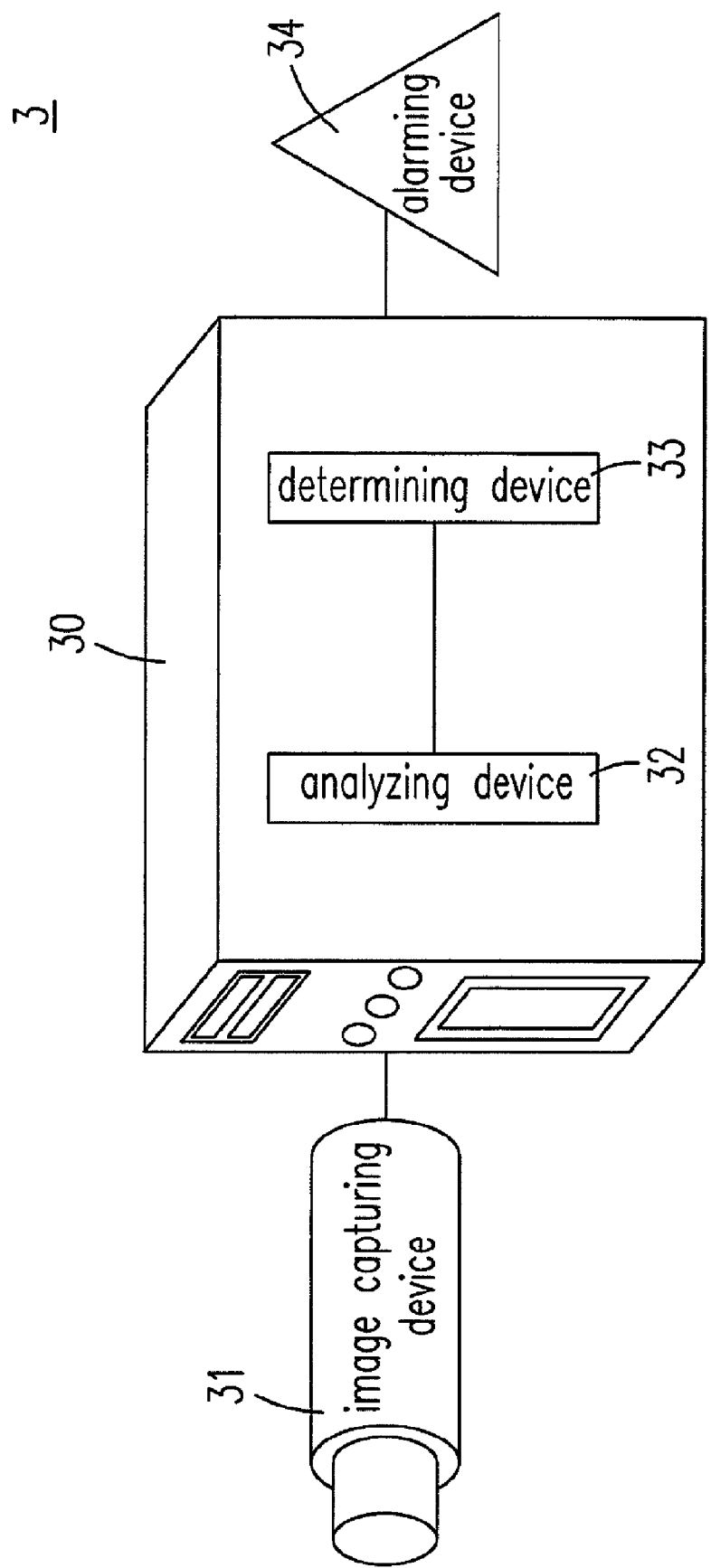
FIG. 3 is a diagram showing a smoke detecting system according to a preferred embodiment of the present invention.

Please refer to FIG. 3, showing a smoke detecting system according to a preferred embodiment of the present invention. The smoke detecting system 3 comprises an image capturing device 31, an analyzing device 32, a determining device 33 and an alarming device 34. The image capturing device 31 is one of a fixed video camera and a movable video camera for capturing a plurality of images of a monitored area. The image capturing device 31 is coupled to a host computer 30 via the internet or other connection ways. The analyzing device 32 is disposed in the host computer 30 and coupled to the image capturing device 31, which determines whether a moving object exists in the images captured by the image capturing device 31 and selects the images having the moving object to be analyzed. The analyzing device 32 further analyzes whether the moving object is moving toward a specific direction and/or analyzes a displacement of a base point of the moving object. The determining device 33 is also disposed in the host computer 30 and coupled to the analyzing device 32, which determines the moving object as a smoke when the moving object is moving toward the specific direction and/or the displacement is less than a threshold value. The alarming device 34 is coupled to the determining device 33, and actuates an alarm when the moving object is determined as the smoke by the determining device 33, wherein the alarm can be transmitted to a fire bureau or other rear systems.

According to the above-mentioned embodiment, the smoke detecting system 3 can be applied to a conventional monitor system of a building. That is to say, the image capturing device 31 may be a monitor installed in a building. Hence, when the computers or other rear systems receiving the captured images are configured to have the analyzing device 32 and the determining device 33, the conventional monitor system of the building will have the function of smoke detection as described in the present invention.

Figure 4:
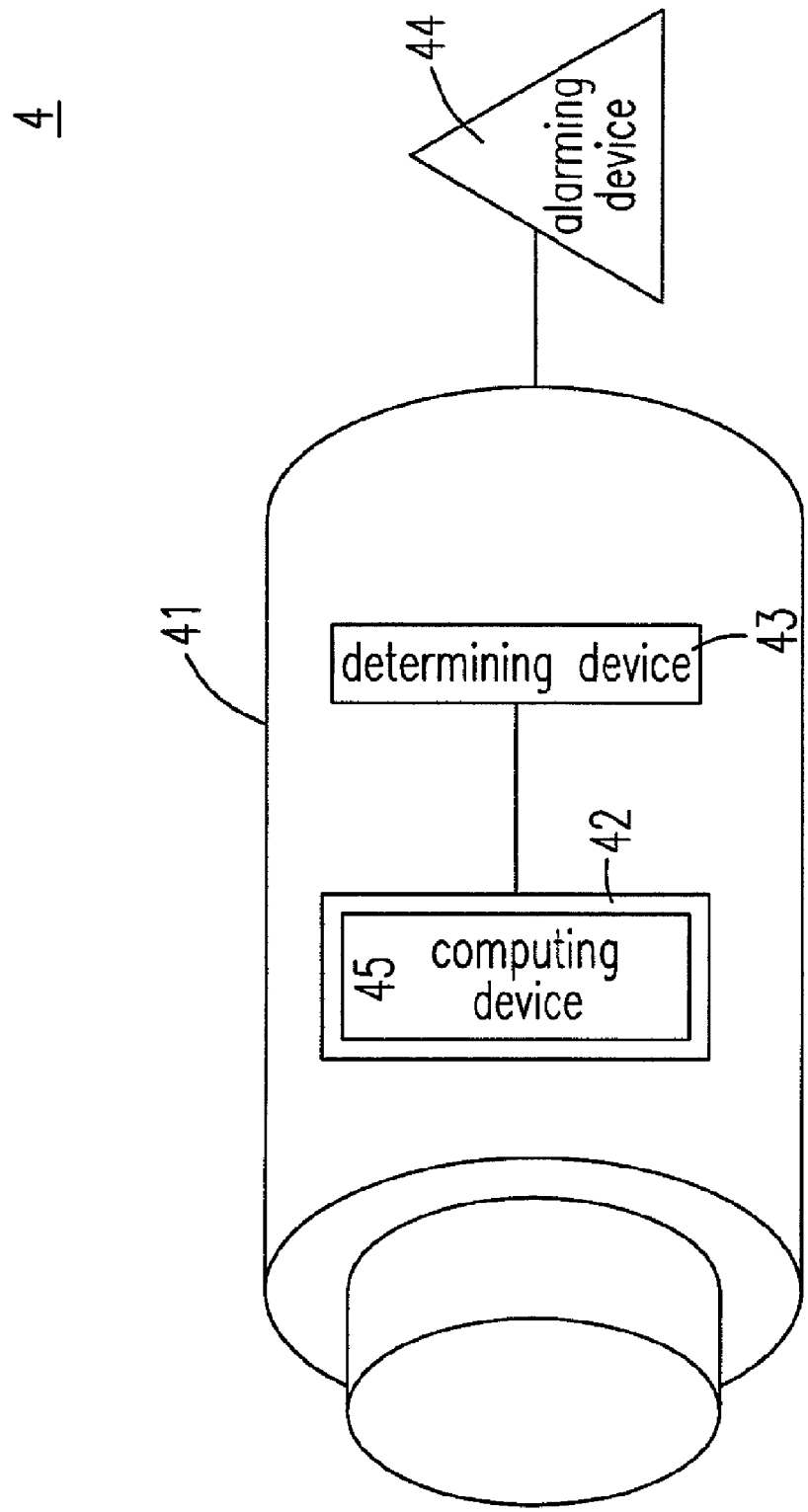
FIG. 4 is a diagram showing a smoke detecting system according to another preferred embodiment of the present invention.

Please refer to FIG. 4, showing a smoke detecting system according to another preferred embodiment of the present invention. The smoke detecting system 4 comprises an image capturing device 41, an analyzing device 42 comprising a computing device 45, a determining device 43 and an alarming device 44. The image capturing device 41 is a digital video recorder for capturing and recording a plurality of images. The analyzing device 42 is a digital signal processing chip for determining whether a moving object exists in the plurality of images and analyzing whether the moving object is moving toward a specific direction. The determining device 43 determines the moving object as a smoke when the moving object is moving toward the specific direction, and the alarming device 44 coupled thereto will actuate an alarm.

In the above-mentioned embodiment, the computing device 45 is configured to perform the following steps: selecting one of the plurality of images having the moving object as a reference image; determining a plurality of pixels showing an upper edge of the moving object in the reference image; superimposing a next image of the reference image thereon to calculate a first ratio of the plurality of pixels moving toward the specific direction; selecting another one of the plurality of images having the moving object as the reference image and repeating the foregoing steps to obtain a predetermined number of superimposed images; calculating a second ratio of a quantity of the superimposed images having the first ratio larger than a first predetermined value to the predetermined number; and determining that the moving object is moving toward the specific direction when the second ratio is larger than a second predetermined value. The specific direction is a direction being one selected from a group consisting of an upward, a left upward and a right upward directions, and a combination thereof.

According to the above-mentioned embodiment, the smoke detecting method and system provided in the present invention use two kinds of parameters to be analyzed. One is the direction the moving object moves toward, and the other is the displacement of the base point of the moving object. An embodiment of analyzing both parameters is illustrated in the steps 14 and 15 in FIG. 1, and the step 16 is performed only when the two analyzing results are both positive. In another embodiment as illustrated in FIG. 4, only analyzing whether the moving object is moving toward the specific direction is enough for enhancing the accuracy of the smoke detecting system, and practically only analyzing the displacement of the base point of the moving object is feasible. Furthermore, the mentioned two analyzing steps for different parameters can be performed at the same time or in a random order. For example, the moving direction is analyzed first and the displacement is analyzed subsequently when the moving object is determined as moving toward the specific direction. Accordingly, if the first analyzed result of the captured images is negative, the other parameter of the captured images will not be analyzed, so as to increase the efficiency of the smoke detecting method and system.

Based on the above, the smoke detecting method and system of the present invention can precisely determine whether a fire smoke exists in an image so as to detect and alarm the fire at the early stage. Therefore, the fire may be put out in its early stage and the disaster and casualties may be prevented. Furthermore, the smoke detecting system may be set in an existing network system or a monitoring device, which achieves a better smoke detecting effect without extra expensive construction or facilities.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A smoke detecting method, comprising:
(a) capturing a plurality of images;
(b) determining whether a moving object exists in the plurality of images;
(c) selecting the images having the moving object to be analyzed;
(d) analyzing whether the moving object is moving toward a specific direction by performing following sub-steps:
if the $n^{th}$ to $(n+k)^{th}$ images have the moving object, superimposing each of the $(n+1)^{th}$ to $(n+k)^{th}$ images on the respective preceding image thereof to generate k pieces of superimposed images, wherein n and k are natural numbers;
in each of the superimposed images, determining a $P_0$ number of pixels showing an upper edge of the moving object in the preceding image and determining a P number of pixels showing an overlapped portion of the upper edge of the moving object in the superimposed image;
calculating a first ratio of P to $P_0$ in the each superimposed image;
calculating a second ratio of a quantity of the superimposed images having the first ratio larger than a first predetermined value to k; and
determining that the moving object is moving toward the specific direction when the second ratio is larger than a second predetermined value; and
(e) determining the moving object as a smoke when the moving object is moving toward the specific direction.

2. The smoke detecting method according to claim 1, further comprising a step of: (f) actuating an alarm when the moving object is determined as the smoke.

3. The smoke detecting method according to claim 1, wherein the specific direction is a direction being one selected from a group consisting of an upward, a left upward and a right upward directions, and a combination thereof.

4. The smoke detecting method according to claim 1, wherein the base point is located at a bottom of the moving object.

5. The smoke detecting method according to claim 1, wherein the steps (a) to (d) are repeated in a predetermined period, and then the step (e) is performed.

6. The smoke detecting method according to claim 1, wherein a combination of the steps (d) and (e) further comprises:
analyzing a displacement of a base point of the moving object; and
determining the moving object as the smoke when the moving object is moving toward the specific direction and the displacement is less than a threshold value.

7. A smoke detecting system, comprising:
an image capturing device capturing a plurality of images;
an analyzing device coupled to the image capturing device, determining whether a moving object exists in the plurality of images, selecting the images having the moving object to be analyzed, and analyzing whether the moving object is moving toward a specific direction by performing following sub-steps:
selecting one of the plurality of images having the moving object as a reference image;
determining a plurality of pixels showing an upper edge of the moving object in the reference image;
superimposing a next image of the reference image thereon to calculate a first ratio of the plurality of pixels moving toward the specific direction;
selecting another one of the plurality of images having the moving object as the reference image and repeating the foregoing steps to obtain a predetermined number of superimposed images;

calculating a second ratio of a quantity of the superimposed images having the first ratio larger than a first predetermined value to the predetermined number; and determining that the moving object is moving toward the specific direction when the second ratio is larger than a second predetermined value; and a determining device coupled to the analyzing device, and determining the moving object as a smoke when the moving object is moving toward the specific direction.

8. The smoke detecting system according to claim 7, further comprising an alarming device coupled to the determining device, and actuating an alarm when the moving object is determined as the smoke.

9. The smoke detecting system according to claim 7, wherein the image capturing device is one of a fixed video camera and a movable video camera.

10. The smoke detecting system according to claim 7, wherein the image capturing device is a monitor installed in a building.

11. The smoke detecting system according to claim 7, wherein the analyzing device further analyzes a displacement of a base point of the moving object, and the determining device determines the moving object as the smoke when the moving object is moving toward the specific direction and the displacement is less than a threshold value.

12. The smoke detecting system according to claim 7, wherein the specific direction is a direction being one selected from a group consisting of an upward, a left upward and a right upward directions, and a combination thereof.

13. The smoke detecting system according to claim 7, wherein the analyzing device is one of a computer and a digital signal processing chip.

14. A smoke detecting method, comprising:
(a) capturing a plurality of images;
(b) determining whether a moving object exists in the plurality of images;
(c) analyzing whether the moving object is moving toward a specific direction by performing following sub-steps:
selecting one of the plurality of images having the moving object as a reference image;
determining a plurality of pixels showing an upper edge of the moving object in the reference image;
superimposing a next image of the reference image thereon to calculate a first ratio of the plurality of pixels moving toward the specific direction;
selecting another one of the plurality of images having the moving object as the reference image and repeating the foregoing steps to obtain a predetermined number of superimposed images;
calculating a second ratio of a quantity of the superimposed images having the first ratio larger than a first predetermined value to the predetermined number; and
determining that the moving object is moving toward the specific direction when the second ratio is larger than a second predetermined value; and
(d) determining the moving object as a smoke when the moving object is moving toward the specific direction.

15. The smoke detecting method according to claim 14, wherein the specific direction is a direction being one selected from a group consisting of an upward, a left upward and a right upward directions, and a combination thereof.

16. The smoke detecting method according to claim 14, further comprising a step of: (e) actuating an alarm when the moving object is determined as the smoke.

17. The smoke detecting method according to claim 14, wherein a combination of the steps (c) and (d) further comprises: analyzing a displacement of a base point of the moving object; and determining the moving object as a smoke when the displacement is less than a threshold value.

18. The smoke detecting method according to claim 17, wherein the base point is located at the bottom of the moving object.

19. The smoke detecting method according to claim 14, wherein the steps (a) to (c) are repeated in a predetermined period, and then the step (d) is performed.

* * * * *